Dec. 13, 1932.                Z. ZIVKOVIC                1,891,131
          ROCKING HORSE, ROCKING CHAIR AND THE LIKE
                    Filed March 31, 1932

Z. Živković
    INVENTOR

By: Marks & Clerk
              Attys

Patented Dec. 13, 1932

1,891,131

UNITED STATES PATENT OFFICE

ZAHARIJE ŽIVKOVIĆ, OF BELGRADE, YUGOSLAVIA

ROCKING HORSE, ROCKING CHAIR, AND THE LIKE

Application filed March 31, 1932, Serial No. 602,250, and in Yugoslavia October 29, 1931.

Children's rocking horses are already known, which, although interesting enough for the children, cannot move forward, or at most could only be made to advance by great exertion.

The object of the present invention is to provide a rocking horse, rocking chair or the like which can be moved forward by the rider or occupant in a very simple manner, this result being attained by providing, in the middle of the rockers that carry the wooden horse or the like, wheels which can only move in a forward direction, being prevented by ratchet and pawl mechanism from revolving backwards. Since the horse, when rocking, bears in a forward direction upon the rockers, front wheels are provided, which are journalled at the lower ends of spindles, upon each of which there acts a spring arranged in a suitable guiding cylinder or the like, so that when the horse rocks forward the spindles are forced into their cylinders, overcoming the resistance of the springs, and when the horse rocks backwards the spindles emerge from the cylinders under the action of the springs; but the horse, although its head and fore legs rise, cannot move backwards, because the wheels in the middle of the rockers are prevented from rotating backwards by pawls engaging in ratchet wheels provided beside the central running wheels.

Figure 1:
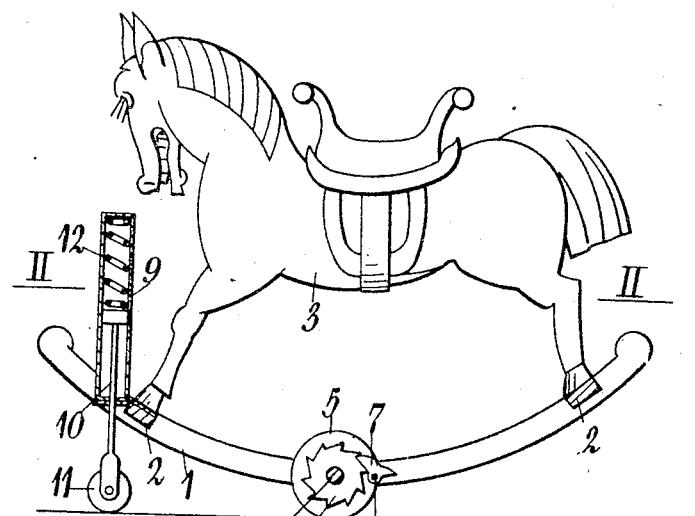
Figure 2:
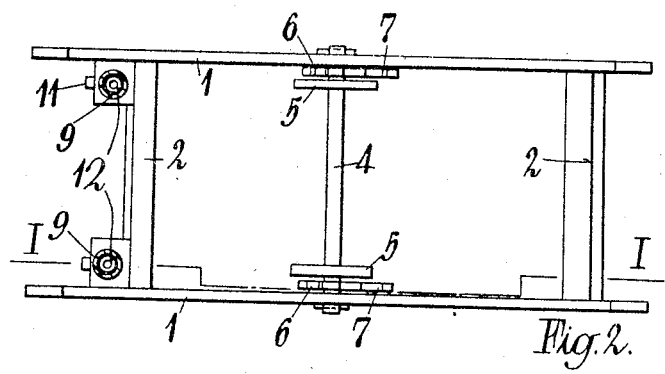

One constructional example of the invention is illustrated in the accompanying drawing, in which Figure 1 shows the rocking horse in side elevation, partly in section on the line I—I in Figure 2, and Figure 2 shows a plan of the rockers and associated mechanism, with the horse removed, the guiding cylinders for the springs being shown in section on the line II—II in Figure 1.

The rockers 1 are connected with one another by means of cross bars 2, which carry a wooden horse or other animal, or a rocking chair or the like. In the middle of the rockers 1 is provided a shaft 4, or a pair of shaft elements, carrying running wheels 5. Beside these wheels 5 are provided ratchet wheels 6 in which there engage pawls 7, which are oscillatably mounted upon pivots 8. The wheels 5 and the ratchet wheels 6 are mounted fast upon the shaft 4, so that they can be rotated with it in a forward direction, whereas they are prevented by the pawls 7 from moving backwards, as the pawls exert a braking action upon this shaft and these wheels whenever they tend to rotate backwards. Upon the front cross bars 2 are secured two cylindrical guides 9, closed at the top in each of which the spindle 10 moves up and down like a piston. The spindles 10 each carry at the lower end a small freely rotatable wheel 11, which may be mounted in a bearing of any desired construction. At their upper ends the spindles are provided with abutments, the diameter of which nearly corresponds to the internal diameter of the cylinders 9, each of these cylinders also being closed at the lower end by a bottom formed with an aperture through which the spindle passes. By this aperture, and by the abutment provided at the top of the spindle, the spindle is accurately guided in the cylinder. Between the closed top of the cylinder 9 and the aforementioned abutment on the spindle 10 is arranged a helical spring 12, which constantly tends to push the spindle 10 out of the cylinder 9 in a downward direction. The force of the spring is fixed in advance as required.

The movable rocking horse, rocking chair or the like, moves forward in the following manner: When anyone mounts the horse the latter is initially located approximately in the position shown in Figure 1. As soon as the rider bends forward the horse also rocks forward, whereupon the spindles enter further into the cylinders 9. Since the centre of gravity is thereby displaced, the horse begins in this position to roll forward upon the wheels 5 and 11, but when this forward movement diminishes the rider leans backwards, whereupon the centre of gravity is again displaced. Now, however, the horse cannot run backwards but can only remain stationary, because the pawls 7 mesh with the teeth of the ratchet wheels 6, so that in this way the movement of the shaft 4 and of the wheels 5 is braked. The horse remains stationary a moment as stated, while the spindles 10 are moving out of the cylinders 9 into their normal positions. The rider then bends forward again and the same series of operations is repeated. In this way the rider upon such a rocking horse can move forward at will.

From the foregoing it will be clear that such rocking horses or rocking chairs are much more interesting to children than those hitherto known, which have no movement other than the rocking motion.

An important advantage of the invention is that any ordinary rocking horse or similar rocking toy can be converted into a rocking horse or rocking toy according to the invention with very little expense.

It will be evident that in place of the spring 12 some other method of pushing the spindle out may be employed without going outside the scope of this invention. Similarly also the cylinders 9, with their spindles and other parts, may be arranged in any other convenient manner, for instance, normally to a tangent drawn from any point on the rockers up to which the horse may occasionally rock.

As already mentioned, chairs, benches and the like may be mounted on the rockers in place of the horse, or any other animal.

What I claim is:

1. A rocking horse, rocking chair or like device, comprising rockers, running wheels rotatably mounted on the rockers at the point where the rockers would normally be in contact with the floor when stationary, means for preventing the wheels from rotating backwards, guides secured to the rockers near the front ends of the rockers, spindles longitudinally movable up and down in the guides, small running wheels journalled at the lower ends of the spindles, and yielding means tending to push the spindles downwards out of the guides.

2. A rocking horse, rocking chair or like device, comprising rockers, a transverse shaft journalled in the rockers in the neighborhood of the point where the rockers would normally be in contact with the floor when stationary, running wheels mounted fast on the shaft and normally adapted to rest on the ground, a ratchet wheel mounted fast on the shaft, a pawl pivotally mounted on one of the rockers and adapted to engage with the teeth of the ratchet wheel and prevent the ratchet wheel, the shaft and the running wheels secured thereto from revolving backwards, guides secured to the rockers near the front ends of the rockers, spindles longitudinally movable up and down in the guides, small running wheels journalled at the lower ends of the spindles, and yielding means tending to push the spindles downwards out of the guides.

3. A rocking horse, rocking chair or like device, comprising rockers, running wheels rotatably mounted on the rockers at the point where the rockers would normally be in contact with the floor when stationary, means for preventing the wheels from rotating backwards, cross bars securing the rockers rigidly to one another, guides secured to the front cross bar, spindles longitudinally movable up and down in the guides, small running wheels journalled at the lower ends of the spindles, and yielding means tending to push the spindles downwards out of the guides.

In testimony whereof I have signed my name to this specification.

ZAHARIJE ŽIVKOVIĆ.